(12) United States Patent
Overfelt et al.

(10) Patent No.: US 11,428,895 B2
(45) Date of Patent: Aug. 30, 2022

(54) SELECTABLE FIXED-FOCUS BINOCULARS

(71) Applicant: BUSHNELL INC., Overland Park, KS (US)

(72) Inventors: Travis C. Overfelt, Lee's Summit, MO (US); Chad N. Van Brunt, Olathe, KS (US); Jacob C. VanBecelaere, Olathe, KS (US)

(73) Assignee: Bushnell Inc., Overland Park, KS (US)

( * ) Notice: Subject to any disclaimer, the term of this patent is extended or adjusted under 35 U.S.C. 154(b) by 199 days.

(21) Appl. No.: 16/663,471

(22) Filed: Oct. 25, 2019

(65) Prior Publication Data

US 2020/0132961 A1    Apr. 30, 2020

Related U.S. Application Data

(60) Provisional application No. 62/751,223, filed on Oct. 26, 2018.

(51) Int. Cl.
*G02B 7/06*        (2021.01)
*G02B 23/18*     (2006.01)

(52) U.S. Cl.
CPC ............. *G02B 7/06* (2013.01); *G02B 23/18* (2013.01)

(58) Field of Classification Search
CPC ............ G02B 23/18; G02B 7/06; G02B 7/12
See application file for complete search history.

(56) References Cited

U.S. PATENT DOCUMENTS

| | | | | |
|---|---|---|---|---|
| 4,428,651 | A * | 1/1984 | Calcutt | G02B 7/06 359/418 |
| 4,818,086 | A * | 4/1989 | Moore | G02B 7/06 359/414 |
| 5,028,123 | A * | 7/1991 | Watanabe | G02B 23/18 359/418 |
| 5,103,248 | A | 4/1992 | Sato | |
| 5,206,758 | A * | 4/1993 | Kim | G02B 7/12 359/414 |
| 6,008,937 | A | 12/1999 | Yano | |
| 6,490,084 | B2 * | 12/2002 | Funatsu | G02B 23/18 359/407 |
| 6,614,603 | B2 * | 9/2003 | Himmele | G02B 7/002 2/209.13 |
| 8,194,314 | B2 | 6/2012 | Yamamoto | |

* cited by examiner

*Primary Examiner* — Christopher Stanford
(74) *Attorney, Agent, or Firm* — Walter M. Egbert, III; Richard J. Brown; Reed Smith LLP

(57) ABSTRACT

A selectable fixed-focus binocular that is highly functional and simple to operate for the end consumers. The binocular combines the close and fine focusing advantages of a traditional binocular with the ease of use offered in a fixed-focus or focus-free style unit to make a versatile, user-selectable focus style binocular. The end-user can use the binocular in a typical, manual focus mode or manipulate the control knob to transition for use as a simple, fixed-focus unit.

15 Claims, 8 Drawing Sheets

SELECTABLE FIXED-FOCUS BINOCULARS

CROSS-REFERENCE TO RELATED APPLICATIONS

This application claims priority to U.S. Provisional Patent Application No. 62/751,223, filed Oct. 26, 2018, the content of which is hereby incorporated by reference in its entirety.

FIELD OF TECHNOLOGY

The present disclosure relates to optical instruments and more specifically, to a fixed-focus optical device with a selectable focus setting.

BACKGROUND

A traditional binocular with manual focus and adjustable diopter is best suited for high-resolution viewing. It may also be adjusted to shift the depth of field. A common high-resolution use case would be to look at a very distant, smaller object or perhaps a near object with fine detail like a bird. A fixed-focus binocular, on the other hand, is intended for a viewing environment where simplicity and/or quick image acquisition is desired. One example of this implementation is at a sporting event where the subjects are changing both position and distance (e.g. 50-500 yd). A single user can quickly lift the binocular to their eyes and be in focus right away provided within the limitations. This effectively means that the unit is always at-the-ready and that the user will not miss anything due to an out-of-focus condition. Furthermore, the same binocular may be shared within a group of spectators who not only have a single, convenient binocular setup for general use, but also one that does not require the user to be familiar with a traditional unit's operation.

Fixed-focus binoculars may be described as essentially any binocular that has its focus setting set to one optical power, for example −0.5 diopters (D), for the two barrels of the optical device. Traditional fixed-focus optical devices lack a mechanism allowing the device to be selectively focused and then fixed to a predetermined focus. Known fixed-focus binoculars are calibrated at the factories where they are manufactured and therefore are preset without a convenient way for a user to change the focus in any way and "re-fix" it at that changed focus (e.g., to accommodate alternative focuses).

With a traditional binocular, a user adjusts the focus wheel to move lenses and achieve a desired near, middle or far focus. This allows the user's eyes to remain relaxed while realizing a magnified, yet crisp image. Conversely, known fixed-focus binoculars have a versatile, fixed-focus setting that is broad enough for a typical user to focus on objects from an approximate range of 50 yards out to about two thousand yards. There are some limitations to a fixed-focus setting in that the user may need to rely on their eyesight to do some of the focusing. The amount of effort required by the user is a combination of the binocular optical design, the user's eyesight and the object's distance from the user. Another limitation is that the binocular likely does not have an adjustable diopter in either barrel, which will make it unsuitable for calibrating to an individual's vision.

The advantage to a versatile, fixed-focus is that of simplicity. The user can pick them up and immediately view their surroundings without the need to fine-tune the focus of the optic manually. Additionally, fixed-focus devices may easily be shared with those nearby without the need to re-focus. The traditional style is more adept to fine detail and/or longer duration viewing.

SUMMARY

Aspects of the present disclosure provide an optical device with one or more selectable, fixed-focus settings. According to one aspect, a selectable fixed-focus binocular is provided. The binocular may include a control knob, an axle coupled to the control knob, and at least one adjustable optical element coupled to the axle and the control knob. A detent engagement mechanism may engage the control knob into a substantially fixed position. The detent engagement mechanism may include, according to one aspect, an axial keyway defined along an inner surface of the control knob. A ball and spring may be disposed in a detent recess defined in the axle. The spring may exert a force on the ball, wherein a portion of the ball is disposed within the axial keyway when the control knob is rotated to align the axial keyway with the detent recess.

According to another aspect of the present disclosure, the detent mechanism may include a driver coupled to a post disposed in the control knob. A first keyway may be defined in the post. A second keyway may be defined on the axle. The second keyway may substantially match the first keyway. The first keyway may engage the second keyway upon the axial movement of the control knob when the first and second keyways are aligned.

According to another aspect, the detent mechanism may include a dual-spring focus assembly. The assembly may include a first ratcheting member and a second ratcheting member engaged with the first ratcheting member. A retaining spring may be coupled to the first ratcheting member. A retaining pin may be coupled to the retaining spring. A backing plate may define a first retaining void wherein axial movement of the first and second ratcheting members is configured to engage the retaining pin with the retaining void.

According to another aspect of the disclosure, an optical device is provided. The optical device may include a first objective barrel and a second objective barrel. Each of the first and second objective barrel may include at least one adjustable optical element and a focus assembly. The focus assembly may include a manual focus wheel, an axle coupled to the manual focus wheel, and a control knob coupled to the axle. A first adjustment pin and a second adjustment pin may be coupled to the at least one adjustable optical element of the first objective barrel. The second adjustment pin may be coupled to the at least one adjustable optical element of the second objective barrel. A detent mechanism may restrict rotational movement of the axle and the control knob.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Aspects of the present disclosure provide a selectable fixed-focus binocular that is highly functional and simple to operate for the end consumers. The selectable fixed-focus binocular combines the close and fine focusing advantages of a traditional binocular with the ease of use offered in a fixed-focus or focus-free style unit to make a versatile, user-selectable focus style binocular. The user may use the binocular in a typical, manual focus mode or manipulate the selectable fixed-focus selector(s) to transition for use as a simple, fixed-focus unit. Such functionality may be implemented into a binocular without significant changes to the entire assembly that would require many new molds.

A user could transition any traditional binocular to a fixed-focus version by adjusting both the primary focus and diopter settings to achieve a −0.5 D setting in both barrels. Provided the user then leaves the settings alone, the binocular could then be used as if it were a fixed-focus version, but by having selected the focus to be fixed.

Adding these adjustable features into the binocular may cause complexity for the user, e.g., the user may not understand how to use them. According to one aspect, controls and/or feedback indicators may be implemented to allow the user to quickly and easily transition the binocular in and out of fixed-focus mode. This allows the binocular to be more versatile not only for the owner, but also for those around them with whom they wish to share.

Aspects of the present disclosure provide a mechanism allowing a single binocular to combine the advantages of a traditional, user-actuated, manual focusing unit with those of a versatile, fixed-focus unit (referred to herein as "selectable fixed-focus"). The mechanism, according to one aspect, may include a binocular device having a set of identification markers that allows the user to align a focus set-point to that typically realized in a fixed-focus binocular.

According to another aspect, the mechanism may include a locking mechanism that allows the user to lock into the versatile (or user defined) focus set-point. This may be realized by aligning the focus setting and engaging a lock. According to one aspect, the lock could be of several types, including a set-screw, keyed slider (e.g. splines), spring-ball detent, or an auto-engaging, spring-loaded pin-lock that could be armed and spring loaded to engage once the user rolls the focus wheel to a pre-set position.

According to another aspect an optical device, such as a selectable fixed-focus binocular, may include an automatic, dual-spring-loaded mechanism. The mechanism may quickly change the focus set-point once it is engaged by the user. Stated differently, the user could engage the mechanism, which would in turn automatically change the focus-set-point to a selectable fixed-focus setting.

Figure 1A:
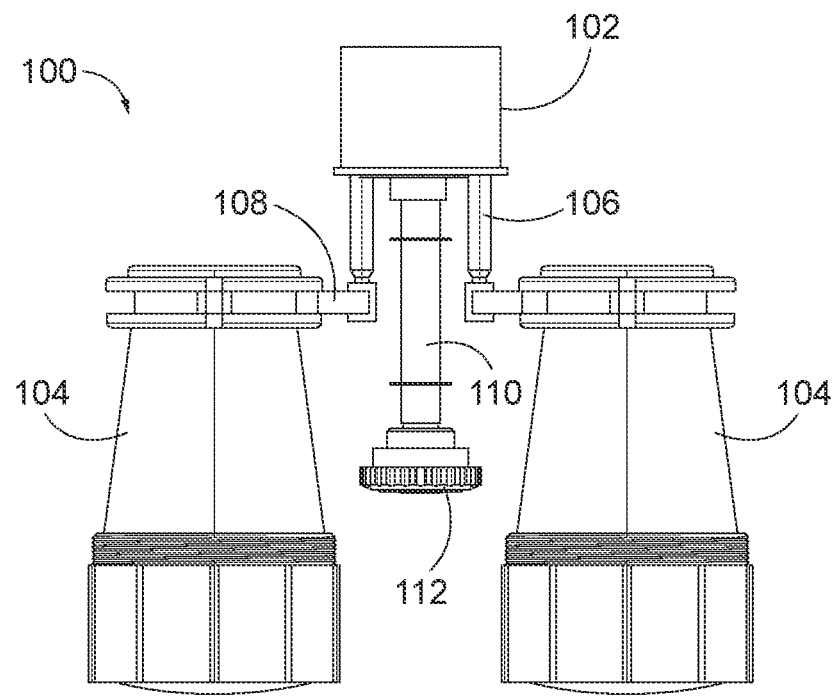
FIG. 1A depicts a portion of a binocular device according to one aspect of the present disclosure.
Figure 1B:
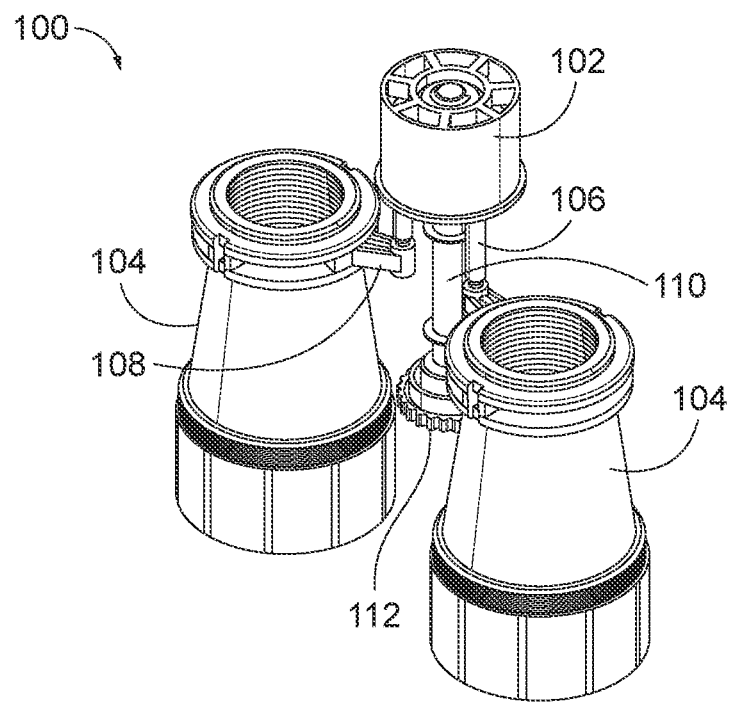
FIG. 1B depicts an isometric view of the binocular device of FIG. 1A according to an aspect of the present disclosure.

FIGS. 1A-1B depict a portion of a binocular device 100 according to an aspect of the present disclosure. While, certain optical and mechanical components have been omitted for ease of explanation, one skilled in the art will recognize that those components and their interaction with the depicted elements are known in the art. Similarly, for ease of explanation a casing or body holding the binocular device has been omitted.

According to one aspect, the binocular device 100 may include one or more objective barrels 104, each with an objective focus mechanism 108, such as a lens carrier configured to move or adjust the optics within the barrel according to a focusing operation. The objective barrel 104 may include lenses and other optics that may be adjusted to control the diopter optical power. The objective focus mechanism 108 may be coupled to a control knob 102 by an adjustment pin 106. A decorative focus wheel 112 may be coupled to the control knob 102 by an axle 110. In operation, according to one aspect, control knob 102 may be rotated, causing the objective focus mechanism 108, through its coupling with the adjustment pin 106 to move axially up or down the objective barrel 104 and adjust the internal optics to the desired focus or optical power.

Figure 1C:
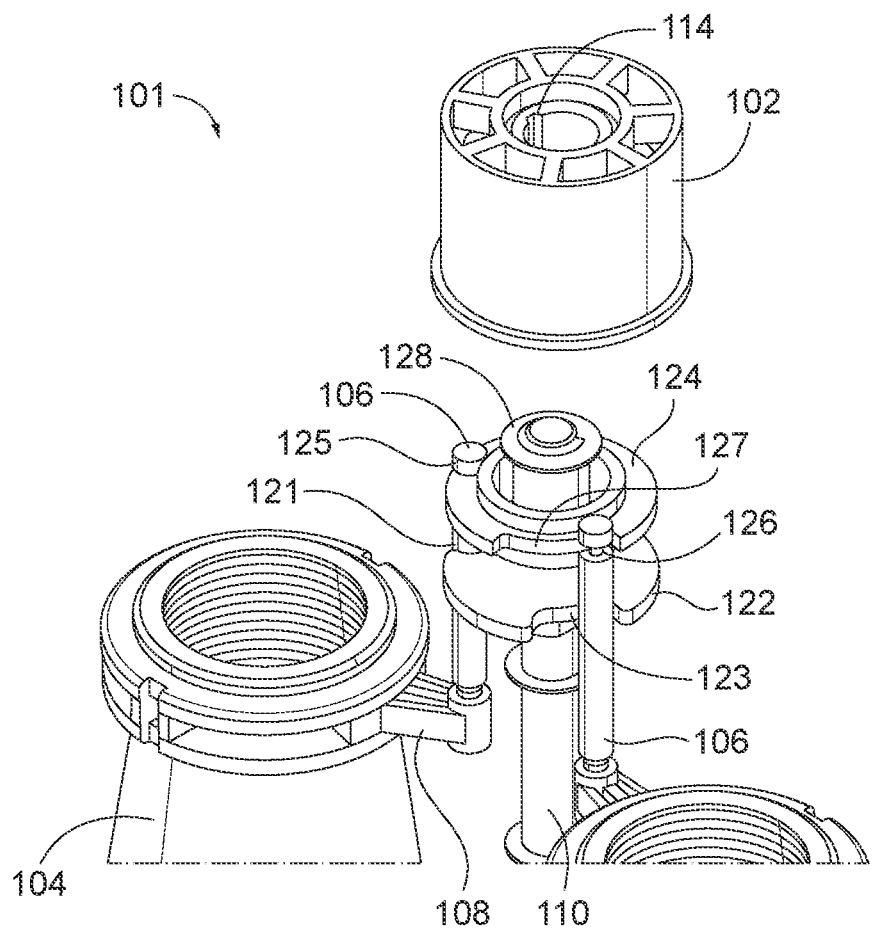
FIG. 1C depicts an isometric exploded view of a focus assembly according to one aspect of the present disclosure.

FIG. 1C depicts a partially exploded view of the focus assembly of the binocular device 100. As depicted in FIG. 1C, the control knob 102 is removed to show a focus assembly 101. The focus assembly 101 may include a retaining ring 128 disposed about the axle 110 and configured to retain the control knob 102 (when assembled as depicted in FIG. 1A.) An axial focus disc 124 may be disposed about the axle 110. The axial focus disc 124 may include or define one or more focus disc recesses configured to receive a notch 126 defined in the adjustment pins 106. According to one aspect, a first axial disc recess 125 may be sized and shaped to be just larger than a circumference of the notch 126. A second axial disc recess 127 may be sized and shaped to be greater than the notch 126 of the adjustment pin 106. A backer plate 122 may also be disposed about the axle 110 and define a first backer plate recess 121 and a second backer plate recess 123, each sized and shaped substantially similar to the first axial disc recess 125 and the second axial disc recess 127, respectively.

Figure 1D:
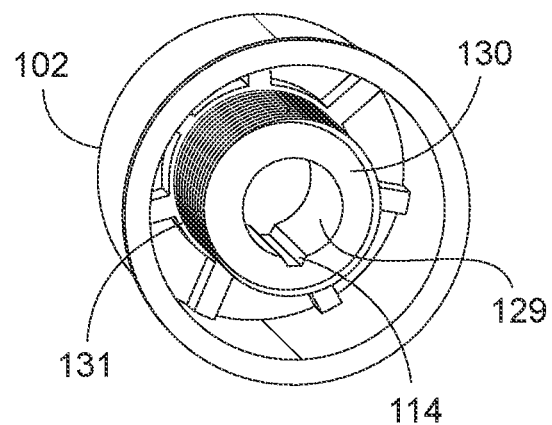
FIG. 1D depicts an isometric view of a focus control knob according to one aspect of the present disclosure.
Figure 1E:
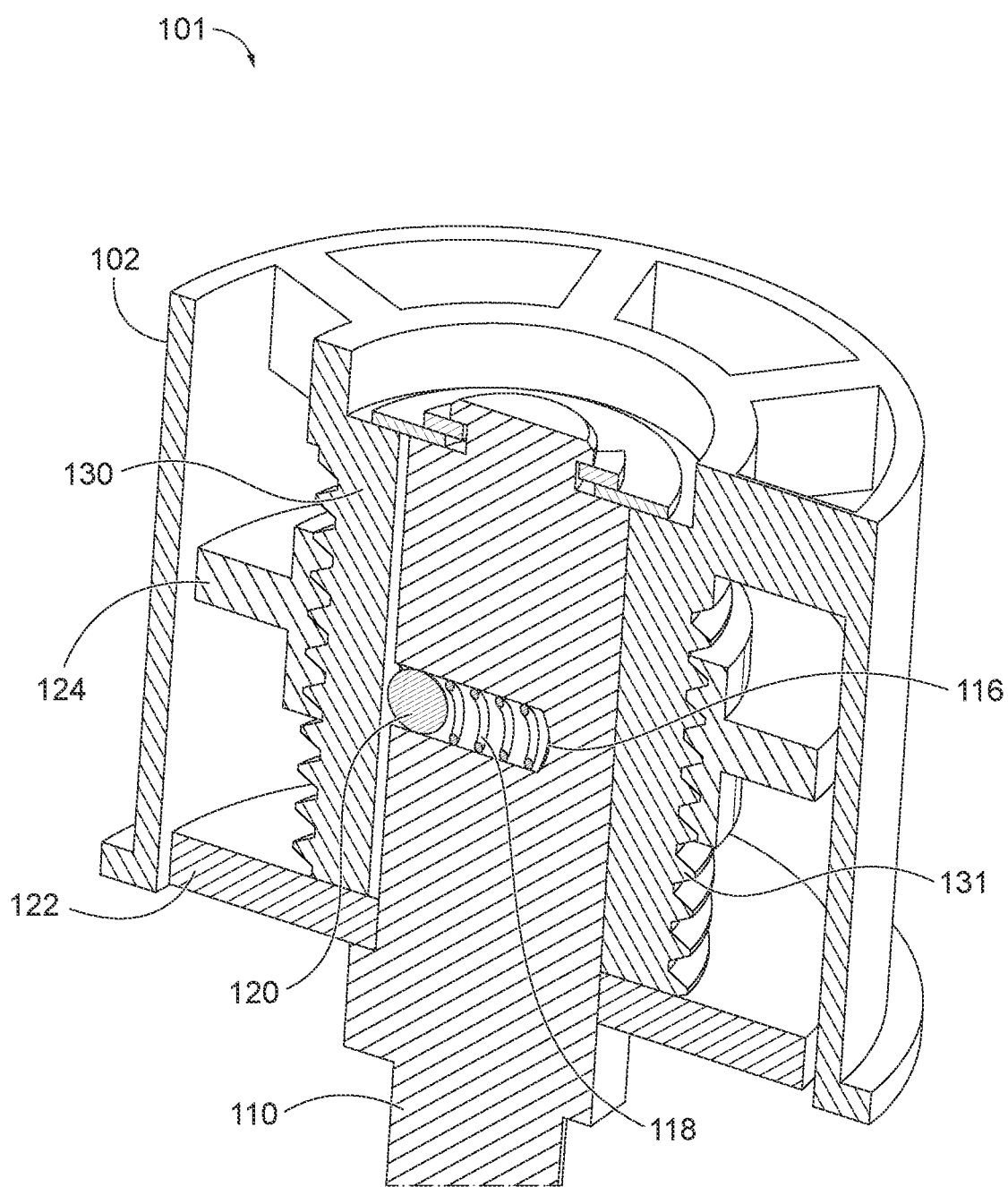
FIG. 1E depicts a cross-sectional view of a focus assembly according to one aspect of the present disclosure.

According to one aspect of the present disclosure, a locking mechanism may be incorporated into the control knob 102 to maintain or hold the focus assembly 101 in a fixed-focus position. The locking mechanism may serve to fix the focus of the optics by preventing the movement of the adjustment pin 106 and objective focus mechanism 108. According to one aspect, the locking mechanism may include a detent mechanism that fixes the focus settings as well as provides tactile feedback to a user indicating a locked position. FIG. 1D depicts an isometric view of a control knob 102 according to one aspect of the present disclosure. FIG. 1E depicts a cross-sectional view of the focus assembly 101. An axial post 130 may be disposed or formed within the control knob 102. The axial post 130 may include an outer surface 131 and an inner surface 129. The outer surface 131 may be threaded as a coupling mechanism to axial focus disc 124. When the control knob 102 is rotated, the axial focus disc 124 may move axially up or down the axial post 130, which in turn drives the axial movement of the adjustment pins 106 and the objective focus mechanism 108. The inner surface 129 may include or define an axial keyway 114. The axial keyway 114 may be sized and shaped to receive a portion of the detent mechanism. For example, the axial keyway 114 may include angled or rounded edges to provide a light holding force restricting the rotation of the control knob 102 when the detent mechanism is engaged.

The detent mechanism may, according to one aspect include a ball 120 and spring 118 arrangement disposed in a detent recess 116 defined in the axle 110. In operation, as the control knob 102 is rotated about the axle 110 into alignment with a calibrated position of e.g., −0.5 D for the an objective barrel 104, the ball 120 may compress the spring 118 until the control knob 102 is rotated to an angle whereby the axial keyway 114 aligns with the ball 120. At that position, the spring may exert an outward force on the ball pushing a portion of the ball into the axial keyway 114. The ball 120 may exert a force on the edges of the axial keyway and provide resistance against further rotation. The engagement of the ball 120 with the axial keyway 114 may provide a tactile feedback to the user indicating that the fixed-focus setting has been achieved.

The rounded or angled edges of the axial keyway 114 may allow a user to provide a rotational force to the control knob 102 that exerts a force on the ball 120 against the spring 118 and pushing the ball back into the detent recess 116. The optics of the objective barrel 104 may be similarly configured, according to one aspect of the disclosure, to also be adjusted to a position slightly negative (−0.5 D) of neutral and engage a barrel detent mechanism with the objective focus mechanism 108. According to one aspect, the barrel detent mechanism may be substantially similar to that of the focus assembly 101.

Figure 2A:
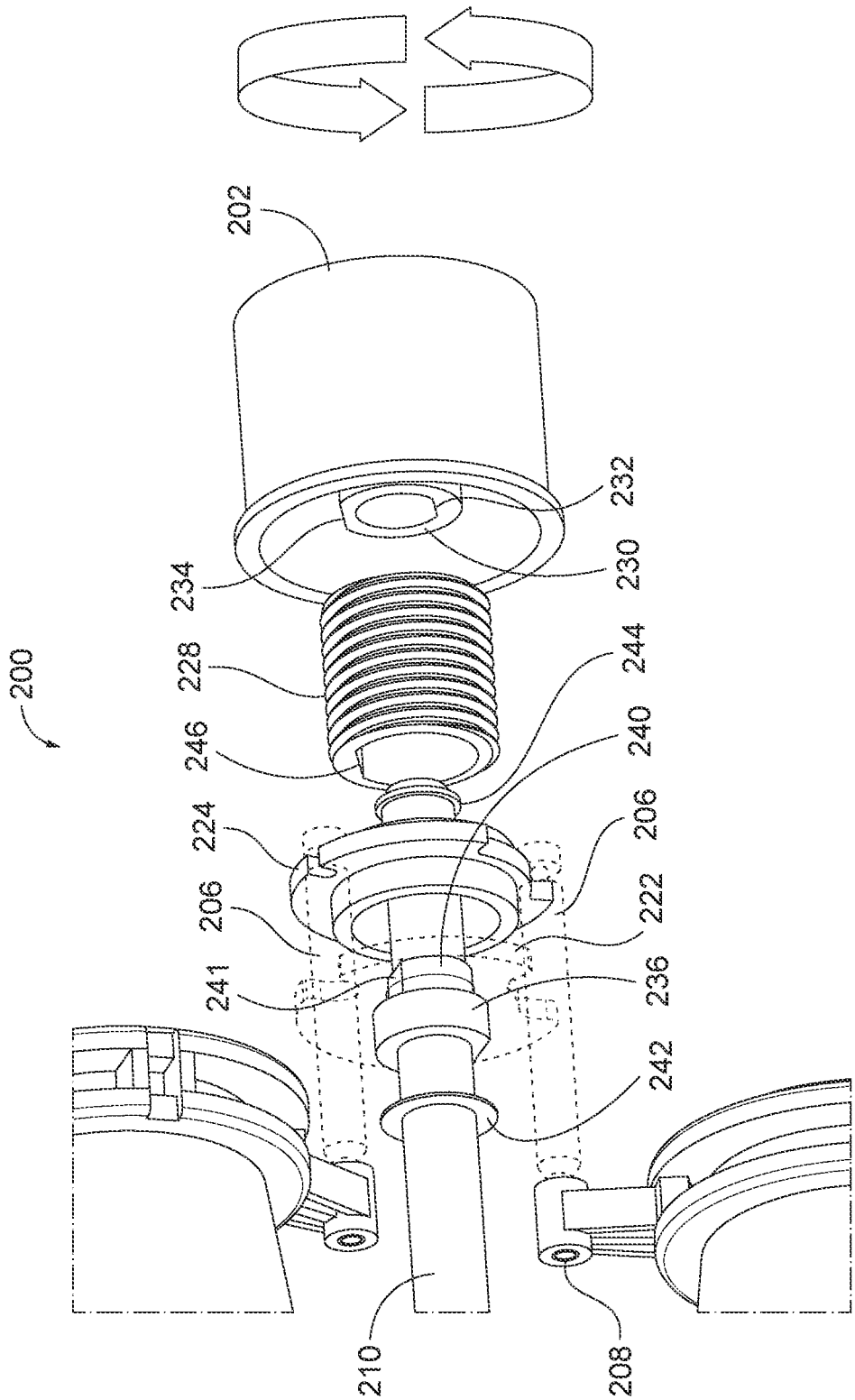
FIG. 2A depicts an exploded view of a focus assembly at a first position according to one aspect of the present disclosure.
Figure 2B:
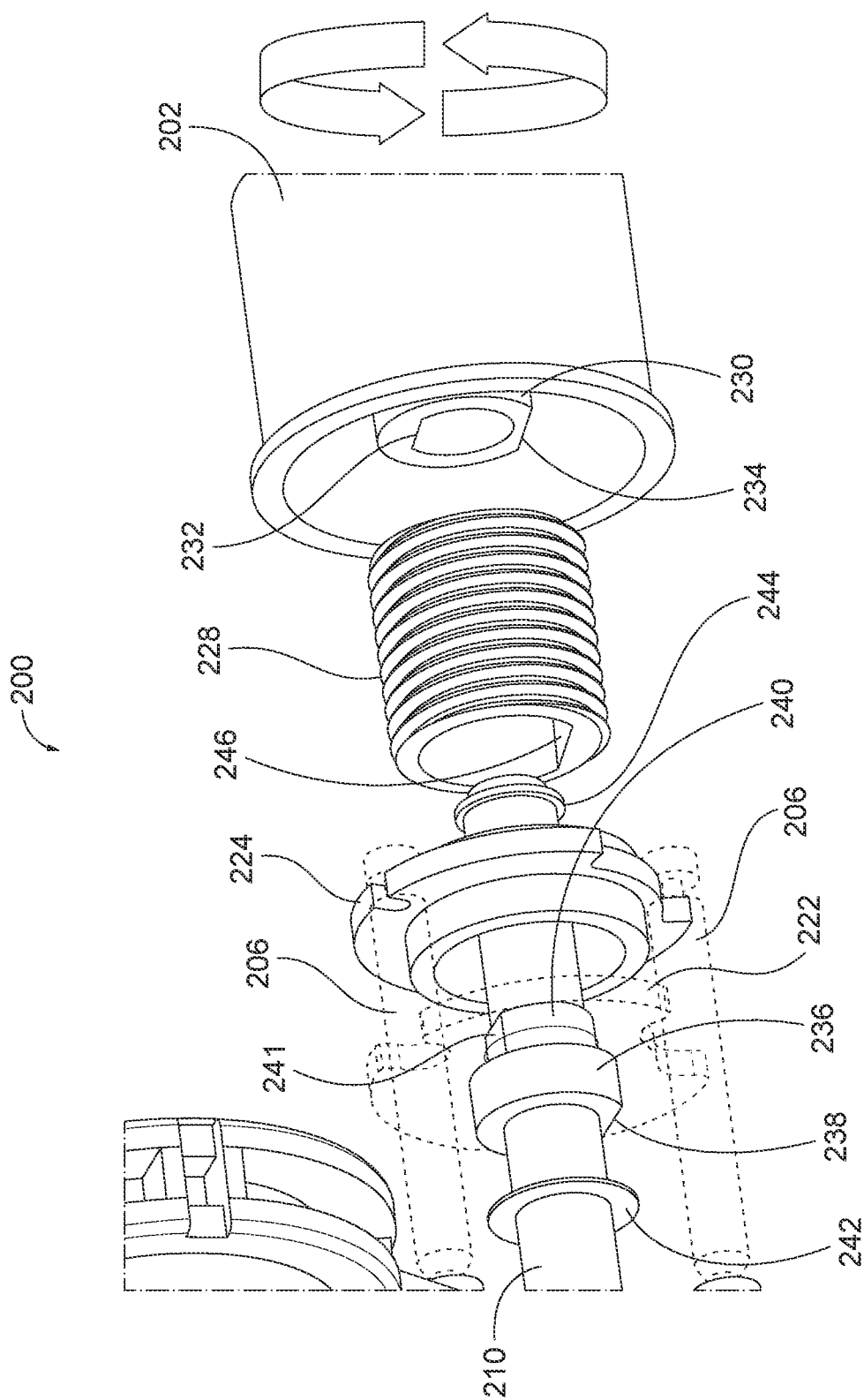
FIG. 2B depicts an exploded view of the focus assembly of FIG. 2A at a second position according to one aspect of the present disclosure.
Figure 2C:
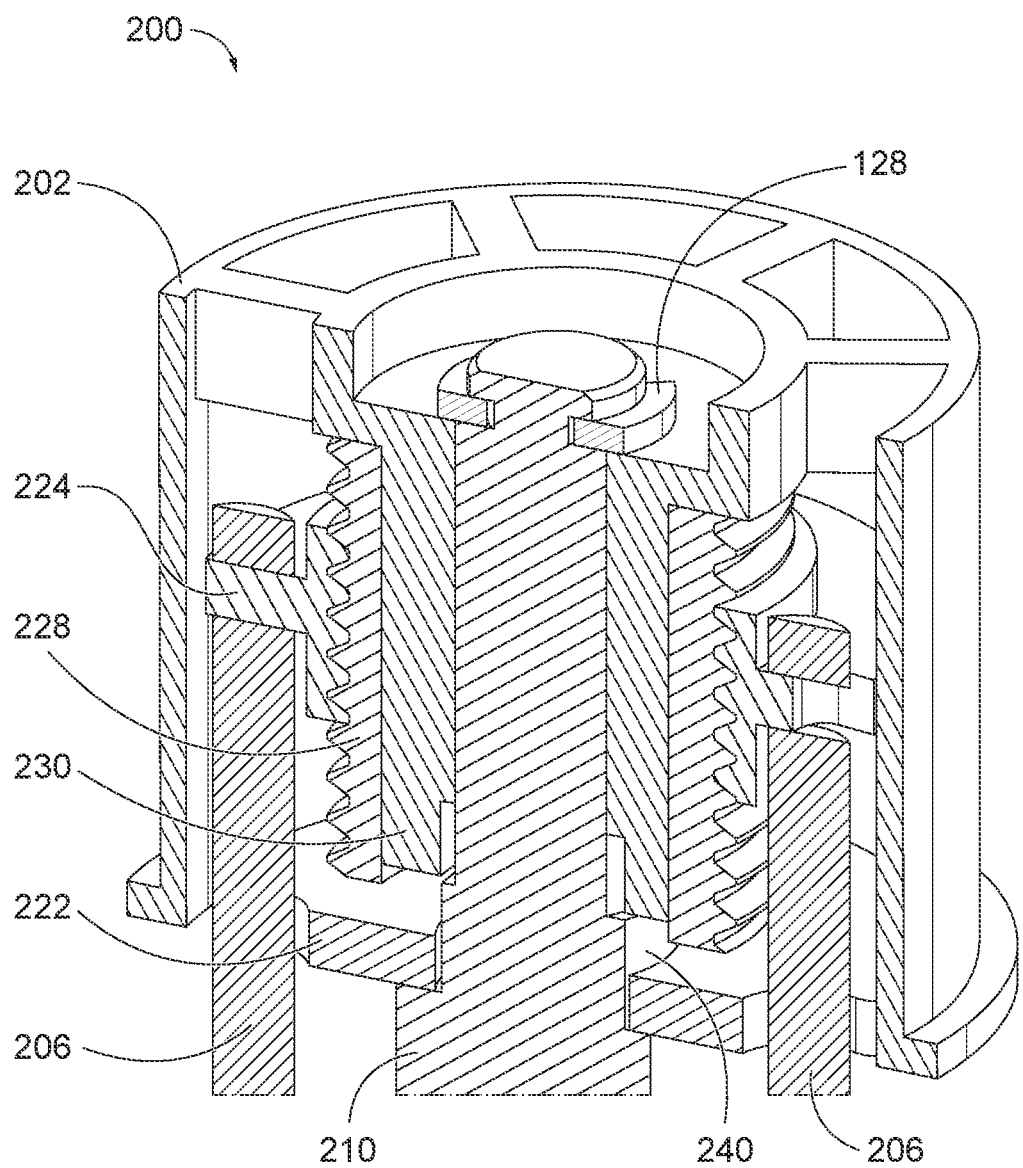
FIG. 2C depicts a cross-sectional view of the focus assembly of FIG. 2A according to one aspect of the present disclosure.

According to another aspect of the present disclosure, the focus assembly of a binocular device may include a locking turret mechanism configured to retain the optics of the binocular device in a fixed-focus position. FIGS. 2A-C depict a turret assembly 200 that, according to one aspect, may include an axial movement (in addition to the rotational movement) that allows the binocular device to enter and remain in a fixed-focus position. FIG. 2A depicts an exploded view of a locking turret assembly 200 according to a first position. The first position may correspond to an unlocked setting for the device.

A turret control knob 202 may include or define a turret post 230 axially disposed in the turret control knob 202. The turret post 230 may define an internal turret keyway 232 formed on an inside surface of the turret post 230 and an external turret keyway 234 formed on an outside surface of the turret post 230. The internal turret keyway 232 may include a substantially flat surface that squares off a portion of the internal circumference of the turret post 230. Similarly, the external turret keyway 234 may include a substantially flat surface squaring off the outer circumference of the turret post 230.

A driver 228 may have a threaded outer surface and may be sized and shaped to engage the outer circumference of the turret post 230. An internal surface of the driver 228 may include or define a driver keyway 246. The driver keyway 246 may include a substantially flat surface squaring off the internal circumference of the driver 228. When assembled, the driver keyway 246 may align with the external turret keyway 234 to establish a fitting engagement such that as the turret control knob 202 rotates, the driver 228 also rotates. The turret assembly 200 may include an axial focus disc 224 and a backer plate 222 substantially similar to those described in connection with FIGS. 1A-E, respectively. Further, the axial focus disc 224 may engage the adjustment pins 206, which in turn, engage barrel adjustment mountings 208 as previously described herein.

An axle 210 coupled to a manual focus wheel (not shown) may pass through the backer plate 222 and engage the axial focus disc 224, the driver 228 and the turret post 230. The axle may include or define a turret flange 240. The turret flange 240 may be sized and shaped to fittingly engage the internal surface of the turret post 230. According to one aspect, the axle 210 may include a circlip 244 or other retaining device to engage to turret control knob 202. The circlip 244 may provide resistance to the axial movement of the turret control knob 202. The turret flange 240 may include a turret flange keyway 241 that includes a substantially flat surface squaring off the outer circumference of the turret flange 240. In the first position, depicted in FIG. 2A, the turret flange keyway 241 is not aligned with the turret keyway 232. As such, when assembled, and at the angle of rotation shown, the axle 210 is not in a locking engagement with the turret control knob 202. Such a configuration may allow the user to focus the device using the manual focus wheel manually. FIG. 2C depicts a cross-sectional view of the turret assembly 200 according to one aspect of the disclosure. The turret control knob 202, as shown, may be in the first position corresponding to an unlocked, manual-focus setting. The turret control knob 202 is raised and rotated such that the driver 228 sits above the turret flange 240. At this angle of rotation, the turret keyway 232 (FIG. 2A) is not aligned with the turret flange keyway 241 (FIG. 2A). To achieve a fixed-focus setting, according to one aspect, the user may rotate the turret control knob 202 until it can slide or be pushed into a second position whereby the turret control knob 202 becomes "locked" and the focus of the binocular device may be fixed.

FIG. 2B depicts the turret assembly 200 according to a second position. The second position may correspond to a fixed-focus setting position. According to one aspect, the second position may include the turret control knob 202 and driver 228 rotated to align with the axle 210 such that the axle 210 is restricted from rotational movement. At the second position, the internal turret keyway 232 may align with the turret flange keyway 241 such that when the turret control knob 202 is moved axially toward the axle 210, the turret control knob 202 engages the turret flange 240 in a fitted connection the prevents the rotation of the turret control knob 202. According to one embodiment, a spring may be implemented to pull the turret control knob 202 automatically into a locked position when the keyed features described herein are aligned. The second position may be configured with the optics of the binocular device to a pre-set focus or optical power (e.g., −0.5 D). The turret assembly 200 allows for the binocular device to be quickly and easily configured into a fixed-focus mode or a manual focus mode. As there is only one position by which the turret control knob 202 may be locked, according to one aspect, the user knows that when the turret control knob 202 is fully engaged in a locked position, the device necessarily is in a pre-set-fixed-focus setting.

When the user wishes to "unlock" the fixed-focus setting of the binocular, the turret control knob 202 may be pulled away from the device, disengaging the turret keyway 232 from the turret flange keyway 241 and allowing the axle 210 to rotate by movement of the manual adjusting wheel (not shown).

To make the focus assembly 101 and turret assembly 200 easier to operate, the thread-pitch of the axial post 130 or the driver 228 may be rather coarse to reduce the number of rotations throughout the full focus travel range. Otherwise, there may be two or more revolutions where the detent (FIGS. 1A-1E) or turret locking mechanism (FIGS. 2A-2C) are in alignment thereby inducing confusion for the user.

Figure 3A:
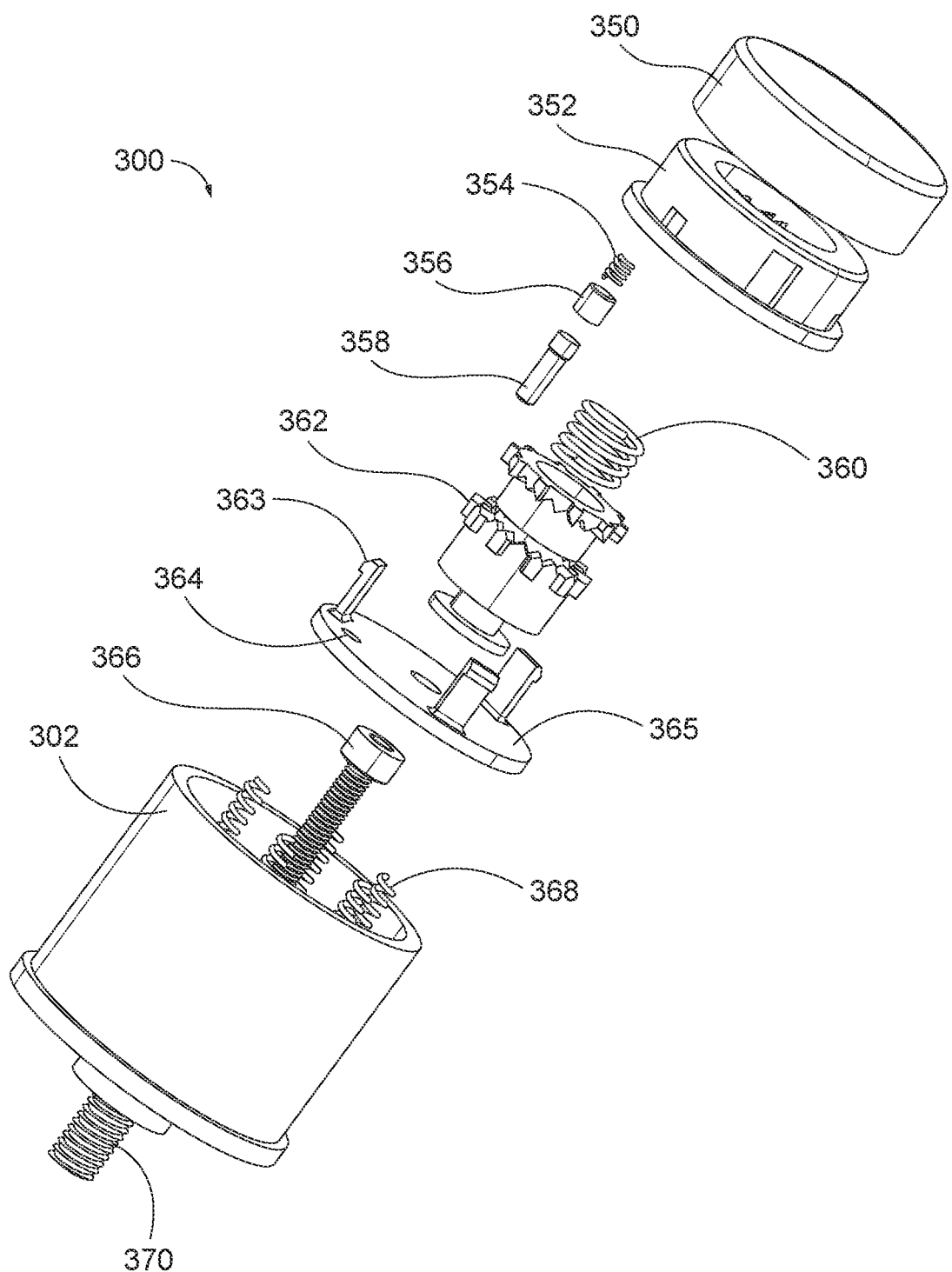
FIG. 3A depicts an exploded view of a focus assembly according to one aspect of the present disclosure.
Figure 3B:
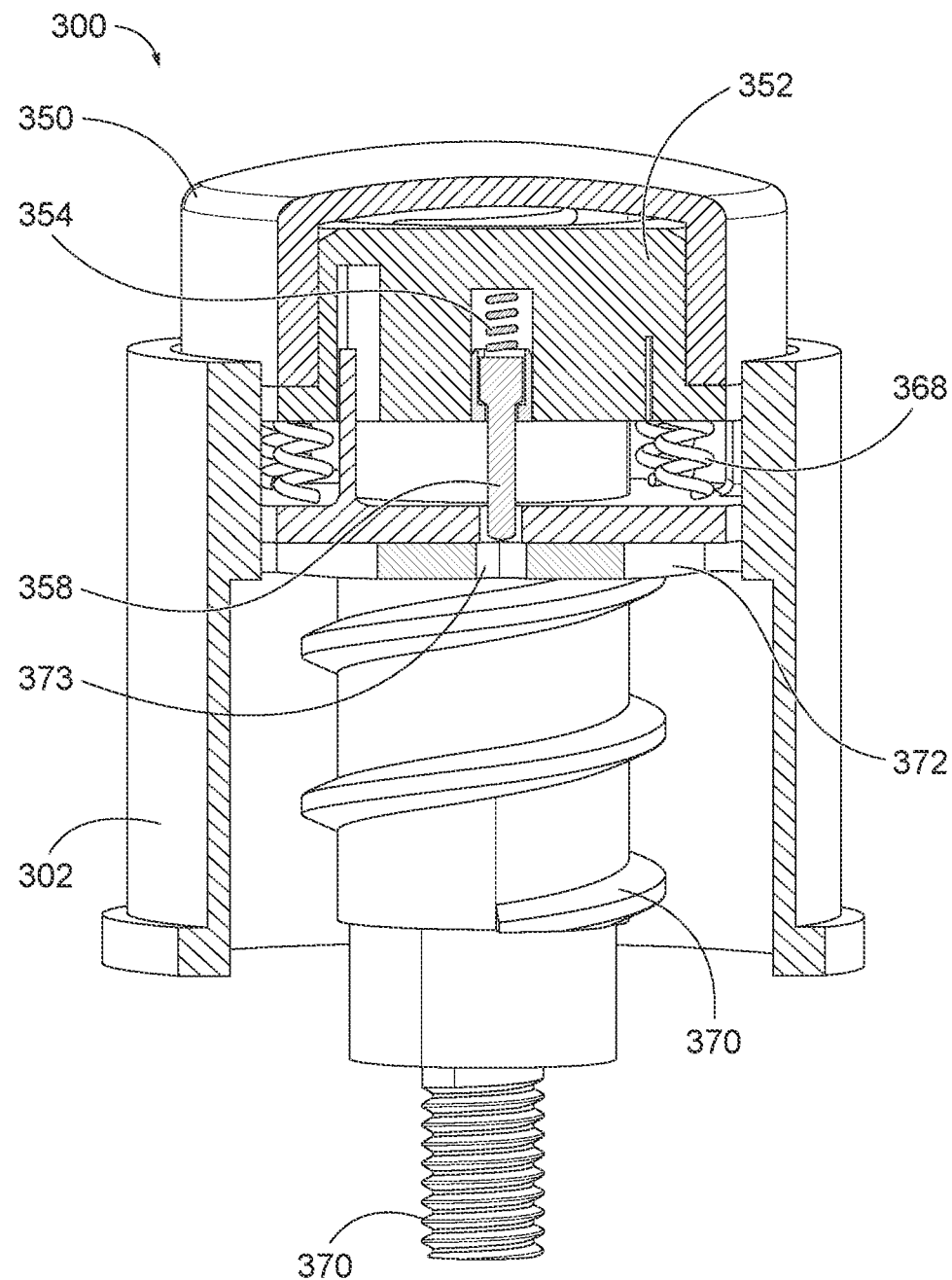
FIG. 3B depicts a cross-sectional view of the focus assembly of FIG. 3A according to one aspect of the present disclosure.

According to one aspect of the present disclosure, a fixed-focus adjustment assembly may include an automatic, dual-spring-loaded mechanism that may quickly change the focus set-point once it is engaged by the user. FIGS. 3A-B depict one such fixed-focus adjustment assembly 300. FIG. 3A depicts an exploded view of a fixed-focus adjustment assembly 300, while FIG. 3B depicts a partial cross-section. A cap 350 may be disposed over a first ratcheting member 352. A first spring assembly may include a first spring 354, a bushing 356 and a retention pin 358. The first spring assembly may be disposed between the first ratcheting member 352 and a backing plate 365. A second ratcheting member 362 may be coupled to the first ratcheting member 352. According to one aspect the first ratcheting member 352 and the second ratcheting member 362 may each include a series of teeth configured to engage each other in a mating configuration.

A ratchet spring 360 may be disposed between the first ratcheting member 352 and the second ratcheting member 362. The ratchet spring 360 may be biased against the first ratcheting member 352 and the second ratcheting member 362 pressing them apart when not engaged. The second ratcheting member 362 may be disposed against the backing plate 365. The backing plate 365 may include one or more tabs 363 configured to engage and retain the first ratcheting member 352. The backing plate 365 may also include or define a void 364 sized and shaped to receive the retention pin 358 when appropriately aligned. A base 302 may include one or more base springs 368 and a bolt 366. The bolt 366 may be a threaded fastener configured retain the second ratcheting member 362 and the backing plate 365 in the base 302 and against the bias of the base springs 368. An attachment post 370 may be disposed or affixed to the base 302 and configured to couple the fixed-focus adjustment assembly 300 to the binocular device. The base 302 may include a base plate 372 and threaded central post 375. The base plate 372 may also include or define a retaining void 373 that is sized and shaped to receive the retention pin 358 when appropriately aligned.

In operation, the fixed-focus adjustment assembly 300 may serve to engage the binocular to a fixed position automatically. According to one aspect, fixed-focus adjustment assembly 300 may operate similarly to a retractable pen mechanism. For example, the cap 350 may be depressed which may cause the first ratcheting member 352 and the second ratcheting member 362 to rotate and fix the position of the retention pin 358 in a position where the retention pin cannot engage the retaining void 373 (FIG. 3B). When the cap 350 is pressed again, the first ratcheting member 352 and the second ratcheting member 362 may rotate to another position by which the retention pin 358 is compressed between the first spring 354 and the backing plate 365. The base 302 may be rotated until the retention pin 358 aligns with the retaining void 373, at which position the first spring 354 may push the retention pin 358 into the retaining void, automatically locking the rotational position of the fixed-focus adjustment assembly 300. In this position, the binocular may be in a fixed-focus state. To return the binocular to a manual-focus operation, the cap 350 may be depressed again, the retention pin 358 is retracted, the first ratcheting member 352 and the second ratcheting member 362 rotate and the base 302 is free to rotate, manually adjusting the focus of the binocular.

While the aspects of the present disclosure present fixed-focus assemblies disposed in or about a control knob or turret, one of skill in the art will appreciate that the location of the detent mechanism and its components is not limited to the control knob. Substantially similar functionality may be accomplished by placing the detent mechanism, wholly or partially, elsewhere in a binocular device, including but not limited to, the bridge.

Although aspects have been described in detail for purposes of illustration, various modifications may be made without departing from the scope and spirit of the present disclosure. Accordingly, the disclosure is not to be limited by the examples presented herein, but is envisioned as encompassing the scope described in the appended claims and the full range of equivalents of the appended claims. The detailed description and drawings are merely illustrative of the present disclosure rather than limiting, the scope of the present disclosure being defined by the appended claims and equivalents thereof.

Benefits, other advantages, and solutions to problems have been described herein with regard to specific embodiments. However, the benefits, advantages, solutions to problems, and elements that may cause any benefit, advantage, or solution to occur or become more pronounced are not to be construed as critical, required, or essential features or elements of the disclosure.

It should be understood that when an element is referred to as being "connected" or "coupled" to another element (or variations thereof), it can be directly connected or coupled to the other element or intervening elements may be present.

Further, it should be appreciated that in the appended claims, reference to an element in the singular is not intended to mean "one and only one" unless explicitly so stated, but rather "one or more."

The description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The words "illustrative" or "exemplary" are used herein to mean "serving as an example, instance, or illustration." Any aspect described herein as "illustrative" or "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

What is claimed is:
1. A selectable fixed-focus binocular, comprising:
a control knob;
an axle coupled to the control knob;
at least one adjustable optical element coupled to the axle and the control knob; and a detent engagement mechanism engaging the control knob into a substantially fixed position, wherein the detent engagement mechanism comprises:
an axial keyway defined along an inner surface of the control knob;
a ball and spring disposed in a detent recess defined in the axle, the spring exerting a force on the ball;
wherein a portion of the ball is disposed within the axial keyway when the control knob is rotated to align the axial keyway with the detent recess.

2. The selectable fixed-focus binocular of claim 1 further comprising a focus wheel coupled to the axle.

3. The selectable fixed-focus binocular of claim 1 wherein the alignment of the axial keyway and the detent recess correspond to a fixed-focus setting.

4. The selectable fixed-focus binocular of claim 1 wherein the alignment of the axial keyway and the detent recess provide a tactile feedback.

5. The selectable fixed-focus binocular of claim 1 further comprising an axial focus disc disposed about the axle and within the control knob, the axial focus disc coupled to the adjustable optical element, wherein axial movement of the axial focus disc correspondingly moves the adjustable optical element.

6. The selectable fixed-focus binocular of claim 5 further comprising an adjustment pin coupled to the axial focus disc and the adjustable optical element.

7. The selectable fixed-focus binocular of claim 6 further comprising an objective focus mechanism coupled to the adjustment pin and the adjustable optical element.

8. A selectable fixed-focus binocular, comprising:
a control knob;
an axle coupled to the control knob;
at least one adjustable optical element coupled to the axle and the control knob; and
a detent engagement mechanism engaging the control knob into a substantially fixed position, wherein the detent mechanism comprises:
a driver coupled to a post disposed in the control knob;
a first keyway defined in the post;
a second keyway defined on the axle, the second keyway substantially matching the first keyway, the first keyway engaging the second keyway upon the axial movement of the control knob when the first and second keyways are aligned, wherein the driver includes a threaded outer surface and a third keyway defined on an interior surface, the third keyway configured to engage a fourth keyway defined on an outer surface of the post.

9. The selectable fixed-focus binocular of claim 8 wherein the second keyway is defined on a first flange of the axle.

10. The selectable fixed-focus binocular of claim 8 further comprising a circlip disposed on the axle and engaging the interior surface of the post, the circlip providing axial resistance to the control knob.

11. A selectable fixed-focus binocular, comprising:
a control knob;
an axle coupled to the control knob;
at least one adjustable optical element coupled to the axle and the control knob; and
a detent engagement mechanism engaging the control knob into a substantially fixed position, wherein the detent mechanism comprises a dual-spring focus assembly comprising
a first ratcheting member;
a second ratcheting member engaged with the first ratcheting member;
a retaining spring coupled to the first ratcheting member;
a retaining pin coupled to the retaining spring; and
a backing plate defining a first retaining void;
wherein axial movement of the first and second ratcheting members is configured to engage the retaining pin with the retaining void.

12. The selectable fixed-focus binocular of claim 11 wherein the dual-spring focus assembly is disposed within the control knob, the control knob defining a second retaining void configured to receive the retaining pin.

13. An optical device comprising:
a first objective barrel and a second objective barrel, each of the first and second objective barrel including at least one adjustable optical element; and
a focus assembly comprising:
a manual focus wheel;
an axle coupled to the manual focus wheel;
a control knob coupled to the axle;
a first adjustment pin and a second adjustment pin, the first adjustment pin coupled to the at least one adjustable optical element of the first objective barrel, the second adjustment pin coupled to the at least one adjustable optical element of the second objective barrel; and
a detent mechanism restricting rotational movement of the axle and the control knob wherein the detent mechanism comprises
an axial keyway defined along an inner surface of the control knob;
a ball and spring disposed in a detent recess defined in the axle, the spring exerting a force on the ball;
wherein a portion of the ball is disposed within the axial keyway when the control knob is rotated to align the axial keyway with the detent recess.

14. An optical device comprising:
a first objective barrel and a second objective barrel, each of the first and second objective barrel including at least one adjustable optical element and
a focus assembly comprising:
a manual focus wheel;
an axle coupled to the manual focus wheel;
a control knob coupled to the axle;
a first adjustment pin and a second adjustment pin, the first adjustment pin coupled to the at least one adjustable optical element of the first objective barrel, the second adjustment pin coupled to the at least one adjustable optical element of the second objective barrel; and
a detent mechanism restricting rotational movement of the axle and the control knob wherein the detent mechanism comprises
a driver coupled to a post disposed in the control knob;
a first keyway defined in the post;
a second keyway defined on the axle, the second keyway substantially matching the first keyway, the first keyway engaging the second keyway upon the axial movement of the control knob when the first and second keyways are aligned, wherein the driver includes a threaded outer surface and a third keyway defined on an interior surface, the third keyway configured to engage a fourth keyway defined on an outer surface of the post.

15. An optical device comprising:
a first objective barrel and a second objective barrel, each of the first and second objective barrel including at least one adjustable optical element and
a focus assembly comprising:
a manual focus wheel;
an axle coupled to the manual focus wheel;
a control knob coupled to the axle;

a first adjustment pin and a second adjustment pin, the first adjustment pin coupled to the at least one adjustable optical element of the first objective barrel, the second adjustment pin coupled to the at least one adjustable optical element of the second objective barrel; and a detent mechanism restricting rotational movement of the axle and the control knob wherein the detent mechanism comprises a dual-spring focus assembly comprising a first ratcheting member;
a second ratcheting member engaged with the first ratcheting member;
a retaining spring coupled to the first ratcheting member;
a retaining spring coupled to the retaining spring;
a backing plate defining a first retaining void;
wherein axial movement of the first and second ratcheting members is configured to engage the retaining pin with the retaining void.

\* \* \* \* \*